(12) United States Patent
Wu et al.

(10) Patent No.: US 12,652,682 B2
(45) Date of Patent: Jun. 9, 2026

(54) PRIORITIZED CHANNEL ACCESS FOR SIDELINK COMMUNICATION IN SHARED CHANNEL

(71) Applicant: QUALCOMM Incorporated, San Diego, CA (US)

(72) Inventors: Shuanshuan Wu, San Diego, CA (US); Stelios Stefanatos, San Diego, CA (US); Parisa Cheraghi, Cambridge (GB); Arthur Gubeskys, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 311 days.

(21) Appl. No.: 18/002,643

(22) PCT Filed: Aug. 13, 2021

(86) PCT No.: PCT/US2021/046026
§ 371 (c)(1),
(2) Date: Dec. 20, 2022

(87) PCT Pub. No.: WO2022/046441
PCT Pub. Date: Mar. 3, 2022

(65) Prior Publication Data
US 2023/0239902 A1 Jul. 27, 2023

(30) Foreign Application Priority Data
Aug. 28, 2020 (GR) ............................... 20200100525

(51) Int. Cl.
*H04W 72/40* (2023.01)
*H04W 74/00* (2009.01)
*H04W 92/16* (2009.01)

(52) U.S. Cl.
CPC ......... *H04W 72/40* (2023.01); *H04W 74/002* (2013.01); *H04W 92/16* (2013.01)

(58) Field of Classification Search
CPC ... H04W 72/40; H04W 74/002; H04W 92/16; H04W 74/0808; H04W 76/14; H04L 5/0091; H04L 1/1854; Y02D 30/70
See application file for complete search history.

(56) References Cited

U.S. PATENT DOCUMENTS

2019/0350045 A1   11/2019   Lee et al.
2020/0045724 A1*   2/2020   Lu ........................ H04W 72/121
(Continued)

FOREIGN PATENT DOCUMENTS

EP   3485689 A1   5/2019
WO   2020072757 A1   4/2020
(Continued)

OTHER PUBLICATIONS

International Search Report and Written Opinion—PCT/US2021/046026—ISA/EPO—Nov. 29, 2021.

*Primary Examiner* — Rushil P. Sampat
(74) *Attorney, Agent, or Firm* — ArentFox Schiff, LLP

(57) ABSTRACT

A user equipment (UE) communicates on a shared channel using sidelink transmissions. The UE determines a channel access priority for the sidelink transmission based on a channel access priority for the UE, a channel access priority associated with a packet priority of the sidelink transmission, a congestion level for the channel, or a remaining time in a packet delay budget of the sidelink transmission. The UE performs a channel access procedure based on the channel access priority for the sidelink transmission to assess that the channel is clear prior to transmitting the sidelink transmission, and transmits the sidelink transmission on the channel.

32 Claims, 13 Drawing Sheets

(56)          References Cited

U.S. PATENT DOCUMENTS

2020/0314895 A1 * 10/2020 Bergström ........ H04W 28/0268
2021/0235512 A1 * 7/2021 Lee ....................... H04W 48/02
2021/0392680 A1 * 12/2021 Wang ................. H04W 74/002
2023/0132437 A1 * 5/2023 Lei ........................ H04L 5/0091
                                                          370/329

FOREIGN PATENT DOCUMENTS

WO          2020166990 A1      8/2020
WO      WO 2021212354 A1 * 10/2021

* cited by examiner

902

910
Determine to transmit a sidelink transmission having a packet priority.

920
Determine a channel access priority for the transmission based on the packet priority.

930
Perform a channel access procedure based on the channel access priority for the transmission.

940
Sidelink Packet

904

900

1200

1204
Determine a channel access priority for a sidelink transmission from a set of channel access priorities.

1206
Perform a channel access procedure based on the channel access priority.

1208
Transmit the sidelink transmission to one or multiple receiving UEs based on the channel access procedure.

PRIORITIZED CHANNEL ACCESS FOR SIDELINK COMMUNICATION IN SHARED CHANNEL

CROSS REFERENCE TO RELATED APPLICATION(S)

This application is a National Phase entry of PCT Application No. PCT/US2021/046026, entitled "PRIORITIZED CHANNEL ACCESS FOR SIDELINK COMMUNICATION IN SHARED CHANNEL" and filed on Aug. 13, 2021, which claims priority of Greek application No. 20200100525, entitled "PRIORITIZED CHANNEL ACCESS FOR SIDELINK COMMUNICATION IN SHARED CHANNEL" and filed on Aug. 28, 2020, both of which are expressly incorporated by reference herein in their entirety.

BACKGROUND

Technical Field

The present disclosure relates generally to communication systems, and more particularly, to vehicle-to-vehicle (V2V), vehicle-to-everything (V2X), or other device-to-device (D2D) communication.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. Aspects of wireless communication may comprise direct communication between devices, such as in V2X, V2V, and/or D2D communication. There exists a need for further improvements in V2X, V2V, and/or D2D technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE). The UE may determine a channel access priority for a sidelink transmission from a set of channel access priorities; perform a channel access procedure based on the determined channel access priority; and transmit the sidelink transmission to one or multiple receiving UEs based on the channel access procedure.

In some aspects, the UE may have a configured channel access priority for the sidelink transmission, and determining the channel access priority for the sidelink transmission may include determining the configured channel access priority for the UE to be the channel access priority.

In some aspects, the configured channel access priority may be configured by a network node, and the UE may receive a signal from the network node indicating the channel access priority for the UE.

In some aspects, the UE may have a channel access priority associated with initiating a channel occupancy, and determining the channel access priority for the sidelink transmission may include determining that the sidelink transmission is to initiate a channel occupancy and determining the channel access priority to be the channel access priority associated with initiating a channel occupancy of the UE.

In some aspects, the sidelink transmission may have a packet priority from a set of packet priorities associated with the set of channel access priorities; and determining the channel access priority for the sidelink transmission may be based on the packet priority of the sidelink transmission.

In some aspects, lower channel access priorities may correspond to lower packet priorities.

In some aspects, each packet priority of the set of packet priorities may be mapped to a channel access priority, and determining the channel access priority for the sidelink transmission may include determining the channel access priority based on the packet priority and the mapping.

In some aspects, the set of channel access priorities may have N packet priorities, N being a positive integer; the set of packet priorities may have M packet priorities, M being an integer greater than N; and at least two packet priorities of the set of packet priorities may be mapped to one channel access priority of the set of channel access priorities.

In some aspects, UE may determine a congestion level for the channel, wherein determining the channel access priority for the sidelink transmission may be based on the congestion level.

In some aspects, the congestion level may be based on a channel busy ratio for the channel.

In some aspects, a high congestion level may correspond to a low determined channel access priority.

In some aspects, the sidelink transmission may have a packet delay budget, and determining the channel access priority for the sidelink transmission may be based on a remaining time in the packet delay budget.

In some aspects, a lower remaining time in the packet delay budget may correspond to a higher channel access priority.

In some aspects, each channel access priority of the set of channel access priorities may have a minimum remaining time, and determining the channel access priority for the sidelink transmission may be based on selecting a channel access priority of the set of channel access priorities with a minimum remaining time that is less than the remaining time in the packet delay budget of the sidelink transmission.

In some aspects, determining the channel access priority for the sidelink transmission may be based on a configured channel access priority for the UE, a channel access priority associated with a packet priority of the transmission, a congestion level for the channel, or a remaining time in a packet delay budget of the sidelink transmission.

In some aspects, determining the channel access priority for the sidelink transmission may be based on at least two of a configured channel access priority for the UE, a channel access priority associated with a packet priority of the transmission, a congestion level for the channel, and a remaining time in a packet delay budget of the sidelink transmission.

In some aspects, the sidelink transmission may include one or more of a sidelink control channel transmission and a sidelink data channel transmission.

In some aspects, the channel access procedure may be a contention based channel access with a random contention window size.

In some aspects, the channel access priority may be associated with a channel access parameter, and the UE may perform the channel access procedure using the channel access parameter associated with the channel access priority for the sidelink transmission.

In some aspects, the channel access parameter may be a contention window size or a channel occupancy time duration.

In some aspects, the sidelink transmission may contain a sidelink packet, and transmitting the sidelink transmission to the one or multiple receiving UEs may be broadcasting the packet on the channel.

In some aspects, the sidelink transmission may include the channel access priority determined for the sidelink transmission or a packet priority of the sidelink transmission.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

4

Figure 7:
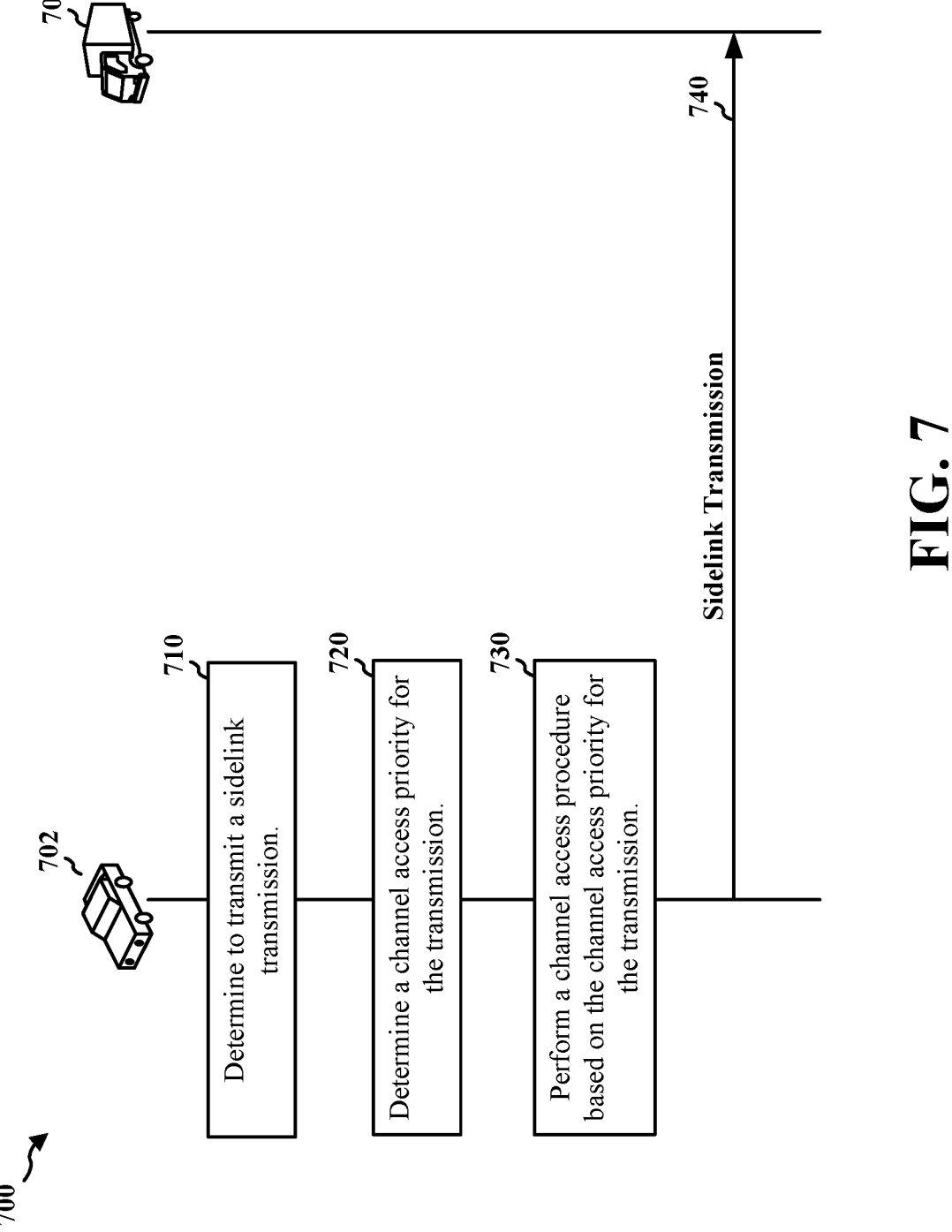

FIG. 7 is a communication flow diagram illustrating a priority-based channel access procedure for sidelink communication.

Figure 8:
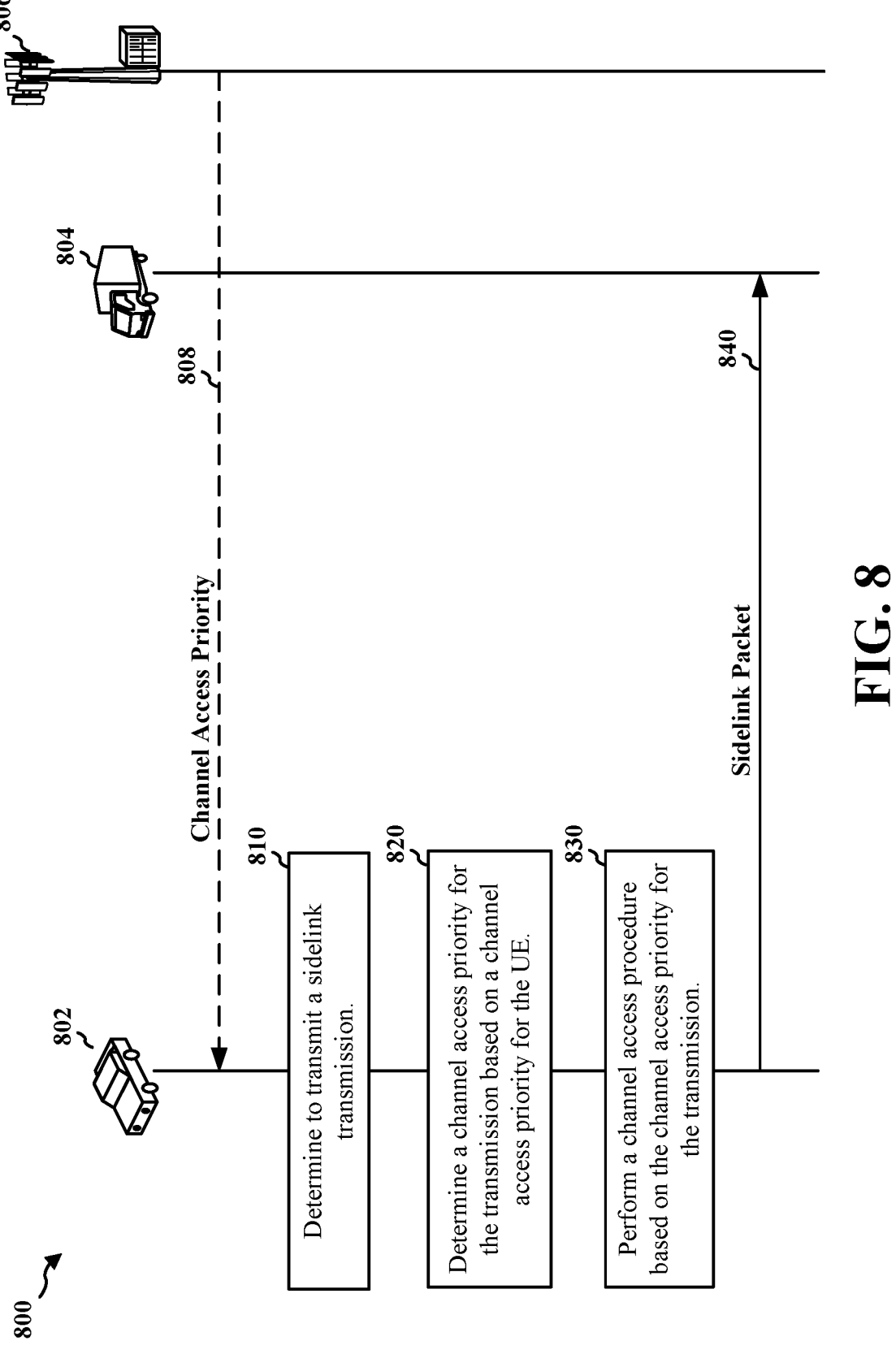

FIG. 8 is a communication flow diagram illustrating a priority-based channel access procedure for sidelink communication based on a channel access priority configuration for a transmitting UE.

Figure 9:
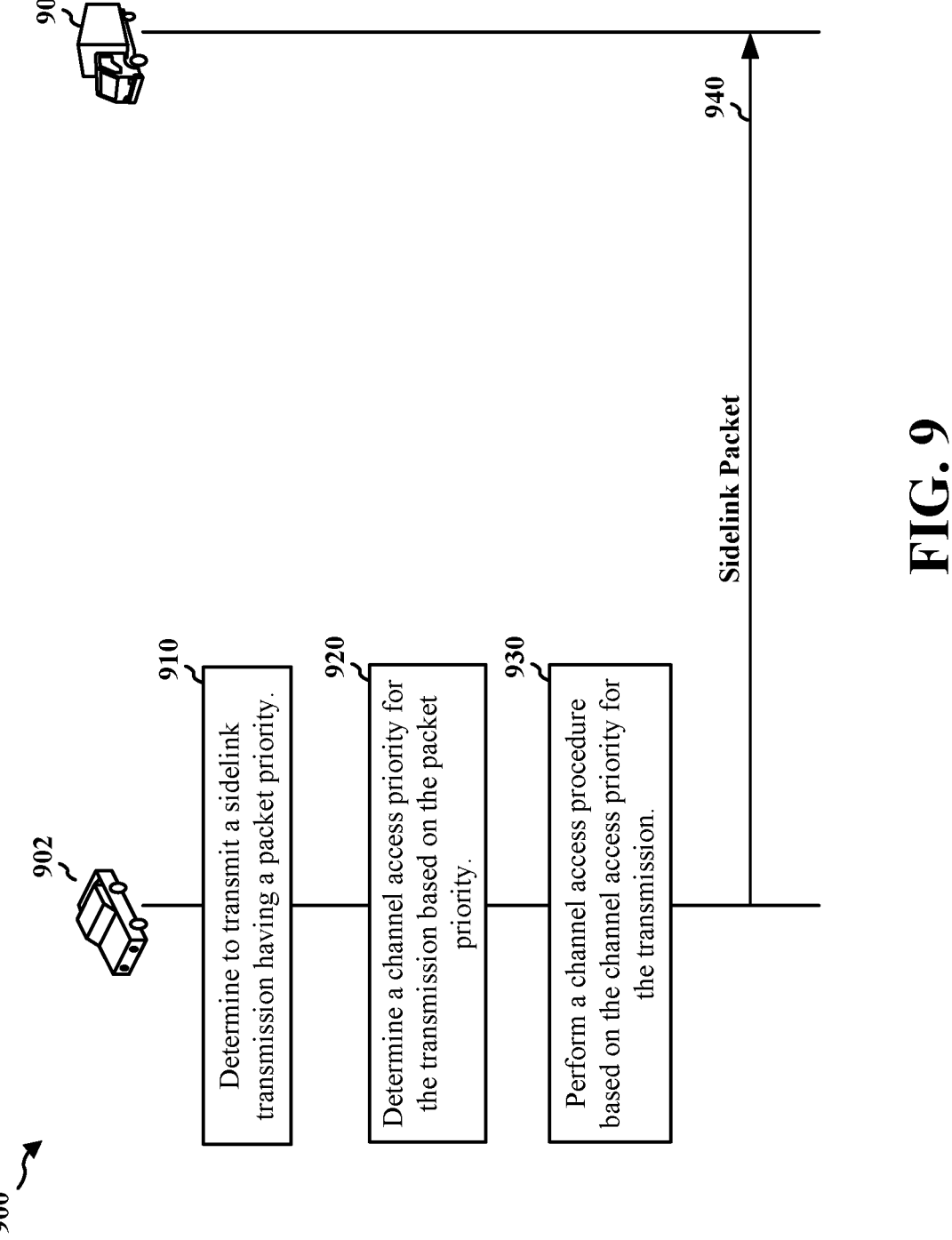

FIG. 9 is a communication flow diagram illustrating a priority-based channel access procedure for sidelink communication based on a packet priority.

Figure 10:
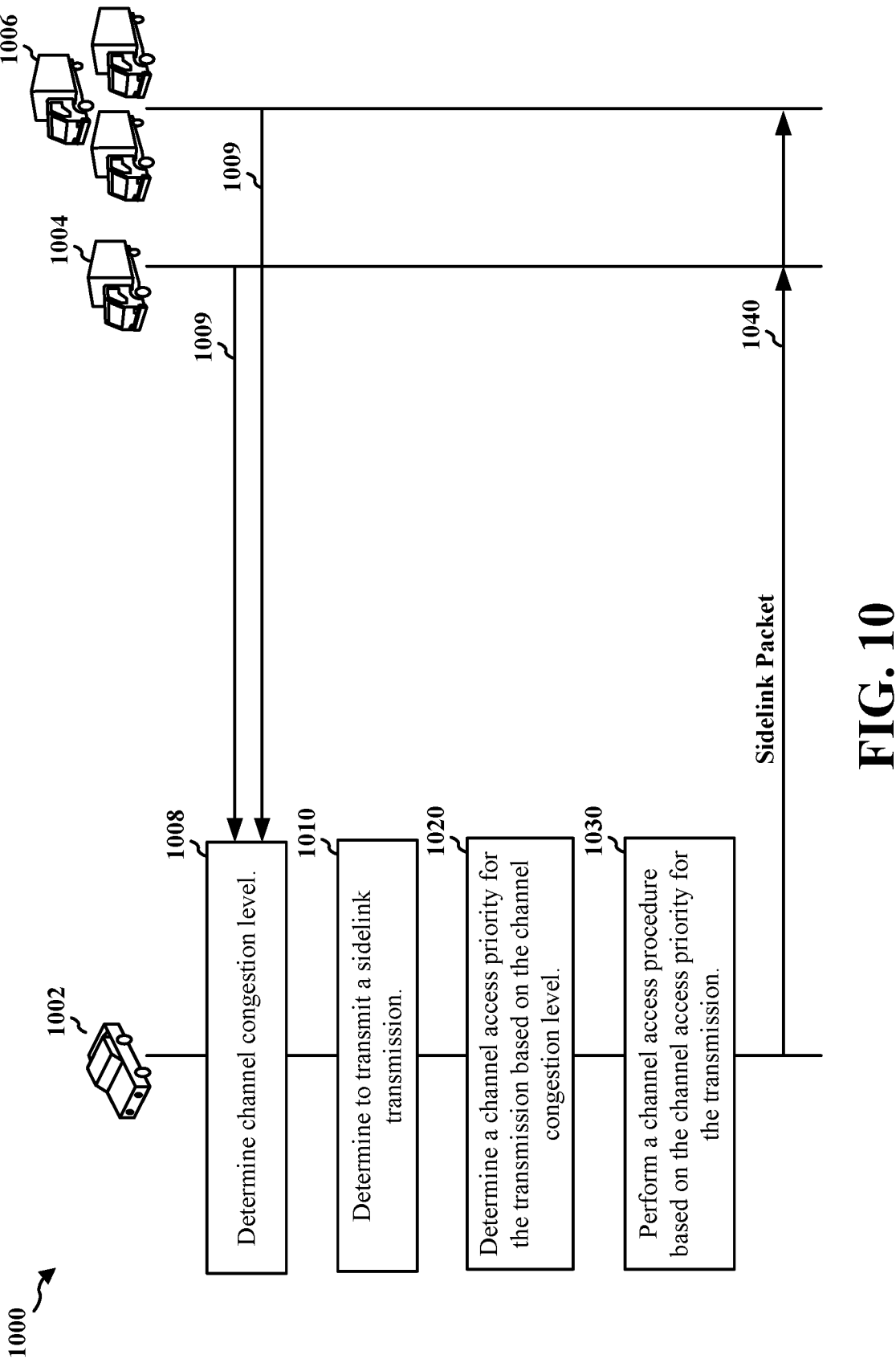

FIG. 10 is a communication flow diagram illustrating a priority-based channel access procedure for sidelink communication based on channel congestion.

Figure 11:
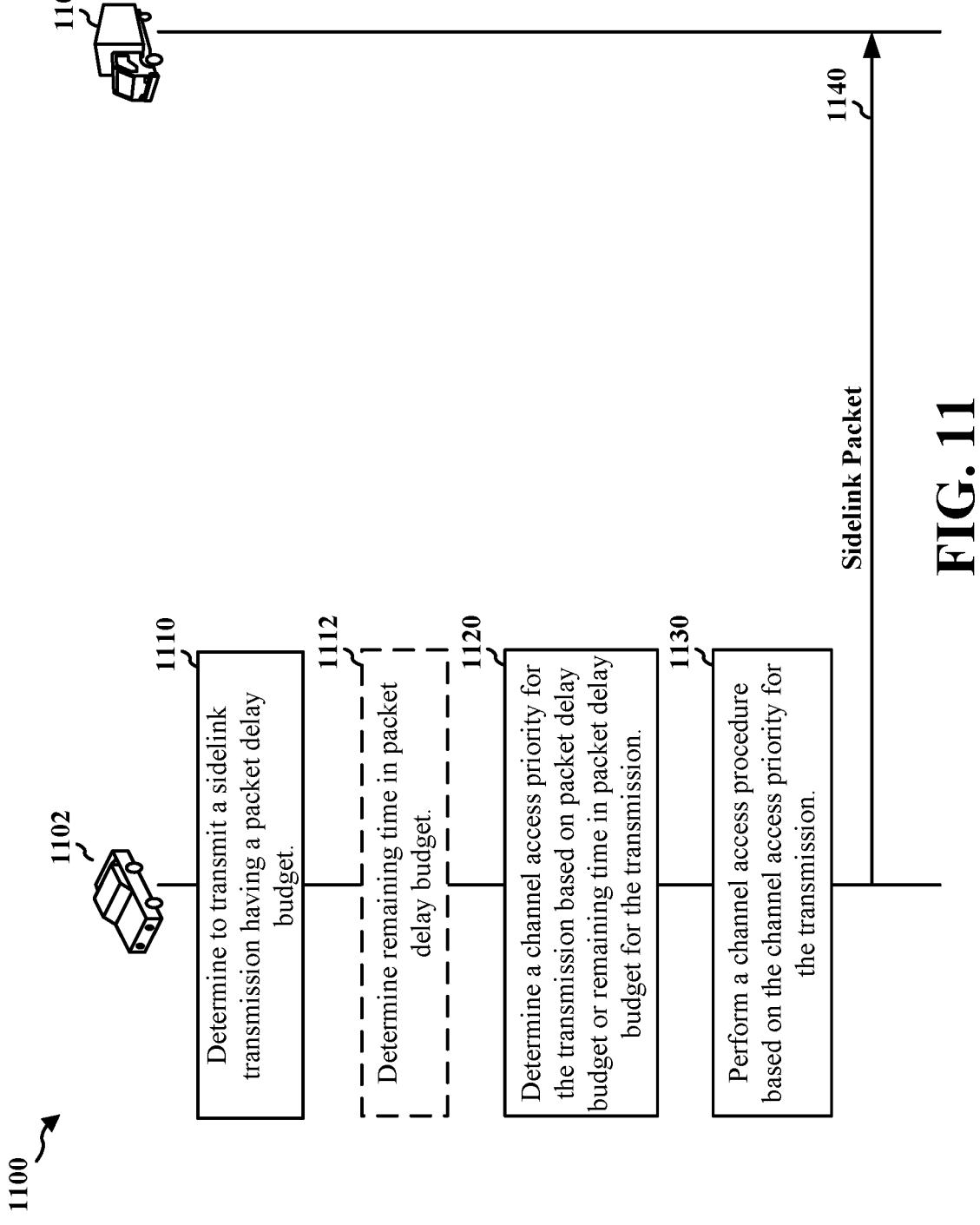

FIG. 11 is a communication flow diagram illustrating a priority-based channel access procedure for sidelink communication based on a remaining packet delay budget.

Figure 12:
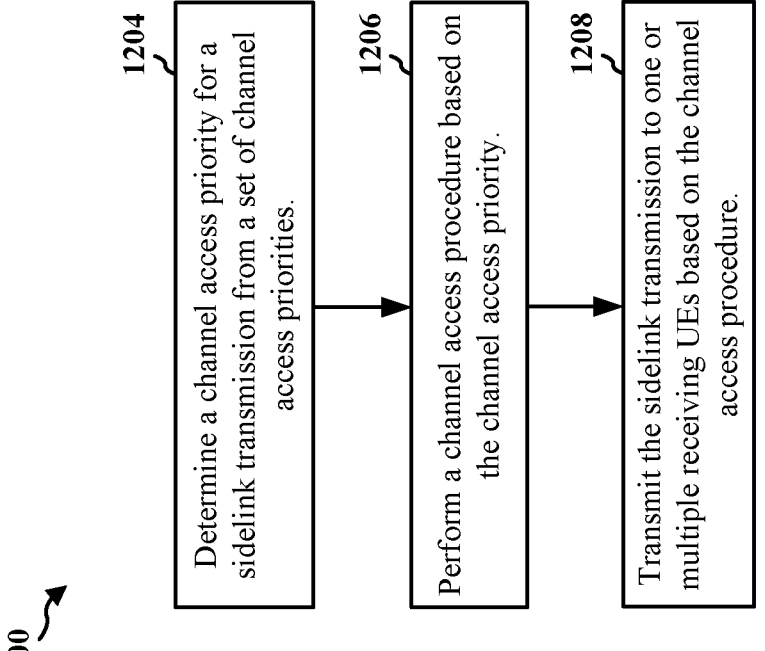

FIG. 12 is a flowchart of a method of wireless communication.

Figure 13:
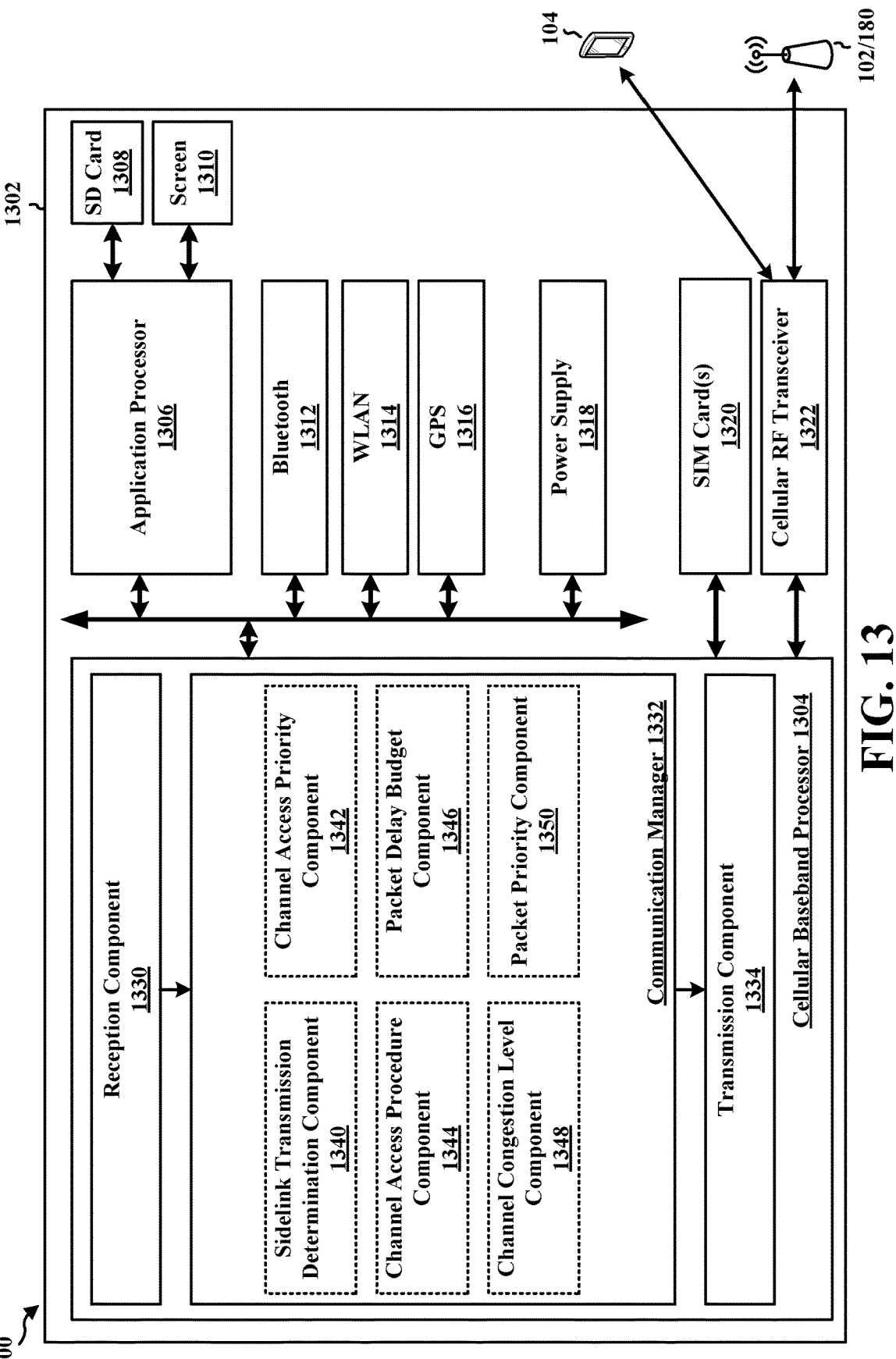

FIG. 13 is a diagram illustrating an example of a hardware implementation for an example apparatus.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Figure 1:
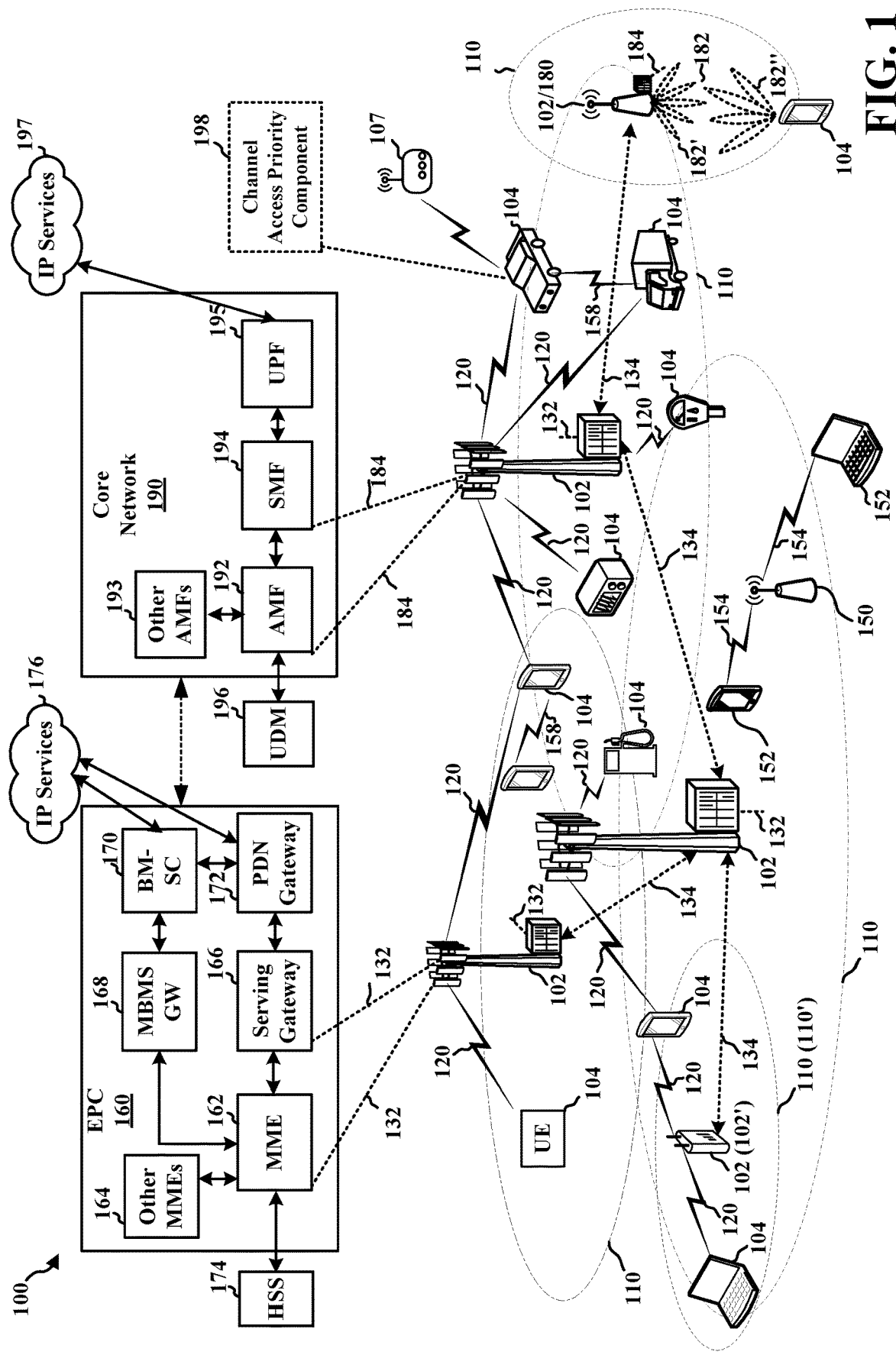
FIG. 1 is a diagram illustrating an example of a wireless communications system and an access network.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a Core Network (e.g., 5GC) 190. The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for NR (collectively referred to as Next Generation RAN (NG-RAN)) may interface with Core Network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or Core Network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network. A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range.

Devices may use beamforming to transmit and receive communication. For example, FIG. 1 illustrates that a base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although beamformed signals are illustrated between UE 104 and base station 102/180, aspects of beamforming may similarly may be applied by UE 104 or RSU 107 to communicate with another UE 104 or RSU 107, such as based on V2X, V2V, or D2D communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The Core Network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the Core Network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or Core Network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Some wireless communication networks may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), and/or a combination thereof and/or with other devices, which can be collectively referred to as vehicle-to-anything (V2X) communications. Referring again to FIG. 1, in certain aspects, a UE 104, e.g., a transmitting Vehicle User Equipment (VUE) or other UE, may be configured to transmit messages directly to another UE 104. The communication may be based on V2V/V2X/V2I or other D2D communication, such as Proximity Services (ProSe), etc. Communication based on V2V, V2X, V2I, and/or D2D may also be transmitted and received by other transmitting and receiving devices, such as Road Side Unit (RSU) 107, etc. Aspects of the communication may be based on PC5 or sidelink communication e.g., as described in connection with the example in FIG. 2. Although the following description may provide examples for V2X/D2D communication in connection with 5G NR, the concepts described herein may be applicable to other similar areas, such as LTE, LTE-A, CDMA, GSM, and other wireless technologies.

Referring again to FIG. 1, in certain aspects, the UE 104 may include a channel access priority component 198 configured to determine a channel access priority for a sidelink transmission. For example, the channel access priority component 198 may determine the channel access priority based on a channel access priority for the UE, a channel access priority associated with a packet priority of the sidelink transmission, a congestion level for the channel, or a remaining time in a packet delay budget of the sidelink transmission.

Figure 2:
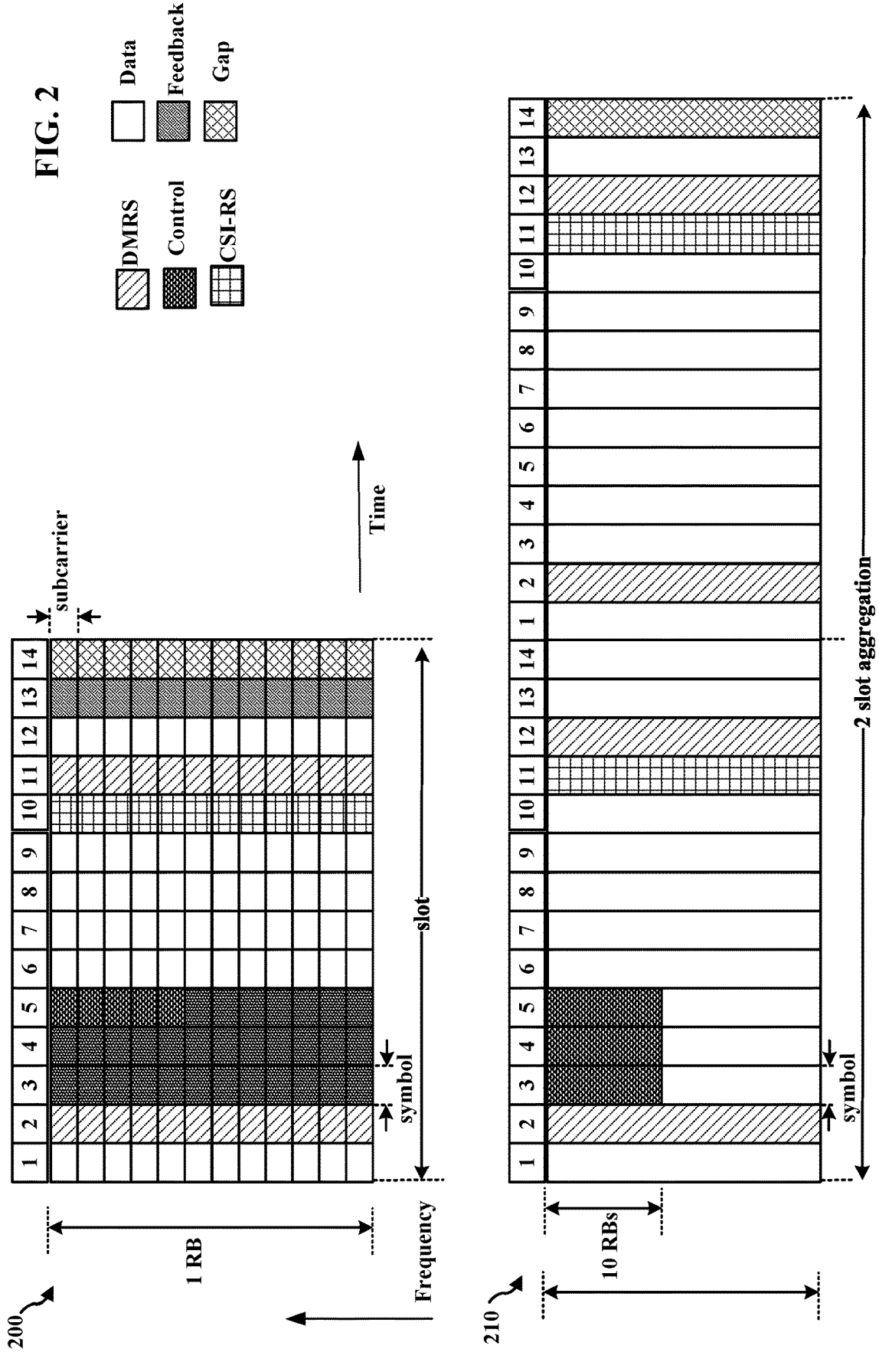
FIG. 2 illustrates example aspects of a sidelink slot structure.

FIG. 2 illustrates example diagrams 200 and 210 illustrating examples slot structures that may be used for wireless communication between UE 104 and UE 104', e.g., for sidelink communication. The slot structure may be within a 5G/NR frame structure. Although the following description may be focused on 5G NR, the concepts described herein may be applicable to other similar areas, such as LTE, LTE-A, CDMA, GSM, and other wireless technologies. This is merely one example, and other wireless communication technologies may have a different frame structure and/or different channels. A frame (10 ms) may be divided into 10 equally sized subframes (1 ms). Each subframe may include one or more time slots. Subframes may also include minislots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single slot transmission, e.g., which may correspond to a 0.5 ms transmission time interval (TTI). Diagram 210 illustrates an example two-slot aggregation, e.g., an aggregation of two 0.5 ms TTIs. Diagram 200 illustrates a single RB, whereas diagram 210 illustrates N RBs. In diagram 210, 10 RBs being used for control is merely one example. The number of RBs may differ.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may comprise control information, e.g., along with demodulation RS (DMRS). FIG. 2 also illustrates that symbol(s) may comprise CSI-RS. The symbols in FIG. 2 that are indicated for DMRS or CSI-RS indicate that the symbol comprises DMRS or CSI-RS REs. Such symbols may also comprise REs that include data. For example, if a number of ports for DMRS or CSI-RS is 1 and a comb-2 pattern is used for DMRS/CSI-RS, then half of the REs may comprise the RS and the other half of the REs may comprise data. A CSI-RS resource may start at any symbol of a slot, and may occupy 1, 2, or 4 symbols depending on a configured number of ports. CSI-RS can be periodic, semi-persistent, or aperiodic (e.g., based on DCI triggering). For time/frequency tracking, CSI-RS may be either periodic or aperiodic. CSI-RS may be transmitted in busts of two or four symbols that are spread across one or two slots. The control information may comprise Sidelink Control Information (SCI). At least one symbol may be used for feedback, as described herein. A symbol prior to and/or after the feedback may be used for turnaround between reception of data and transmission of the feedback. Although symbol 12 is illustrated for data, it may instead be a gap symbol to enable turnaround for feedback in symbol 13. Another symbol, e.g., at the end of the slot may be used as a gap. The gap enables a device to switch from operating as a transmitting device to prepare to operate as a receiving device, e.g., in the following slot. Data may be transmitted in the remaining REs, as illustrated. The data may comprise the data message described herein. The position of any of the SCI, feedback, and LBT symbols may be different than the example illustrated in FIG. 2. Multiple slots may be aggregated together. FIG. 2 also illustrates an example aggregation of two slot. The aggregated number of slots may also be larger than two. When slots are aggregated, the symbols used for feedback and/or a gap symbol may be different that for a single slot. While feedback is not illustrated for the aggregated example, symbol(s) in a multiple slot aggregation may also be allocated for feedback, as illustrated in the one slot example.

Figure 3:
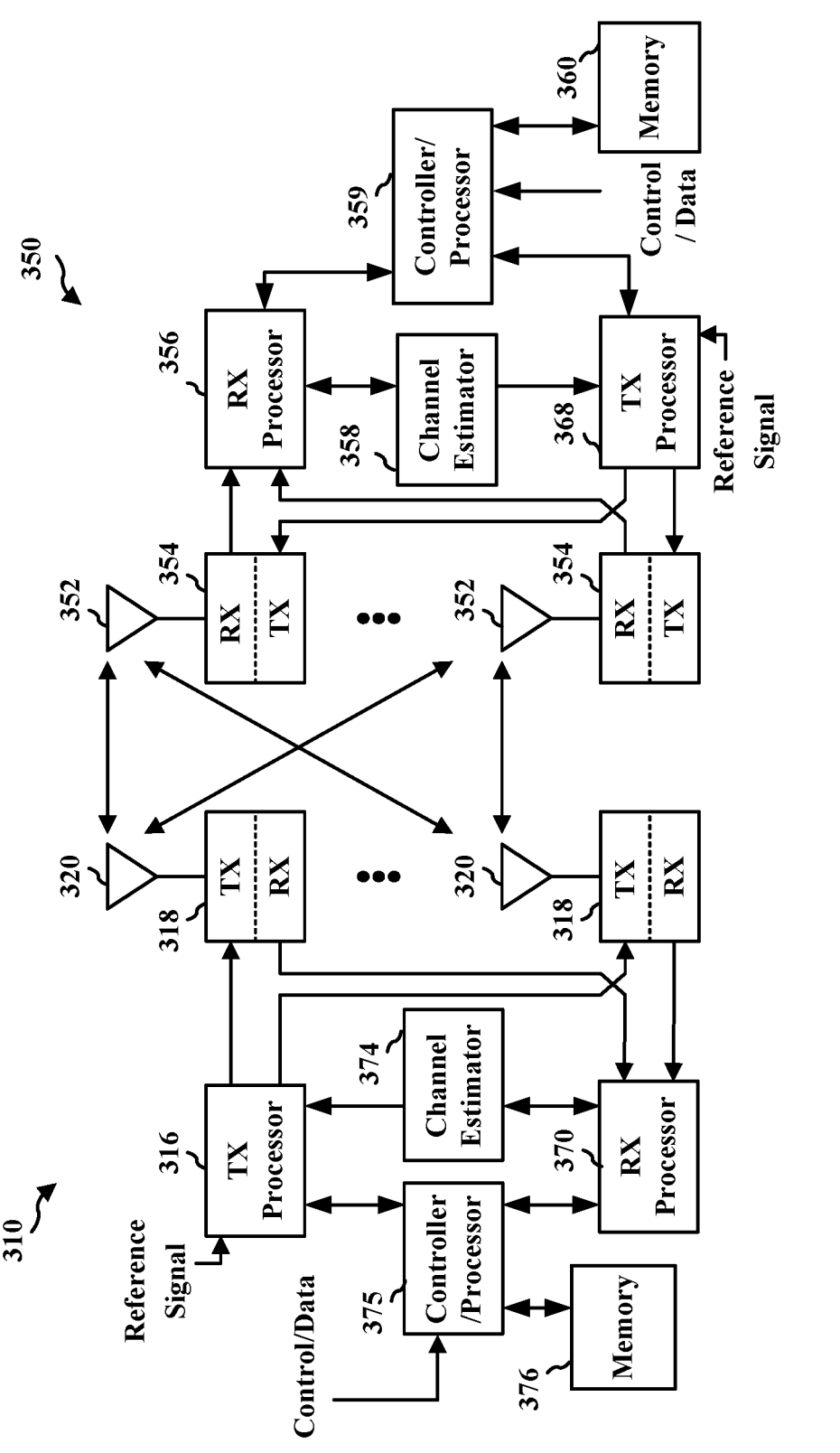
FIG. 3 is a diagram illustrating an example of a first device and a second device involved in wireless communication based, e.g., on V2V, V2X, and/or device-to-device communication.

FIG. 3 is a block diagram 300 of a first wireless communication device 310 in communication with a second wireless communication device 350, e.g., via V2V/V2X/D2D communication. The device 310 may comprise a transmitting device communicating with a receiving device, e.g., device 350, via V2V/V2X/D2D communication. The communication may be based, e.g., on sidelink. The transmitting device 310 may comprise a UE, an RSU, etc. The receiving device may comprise a UE, an RSU, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, or the controller/processor 359 of device 350 or the TX 316, the RX processor 370, or the controller/processor 375 may be configured to perform aspects described in connection with the channel access priority component 198 of FIG. 1.

Figure 4:
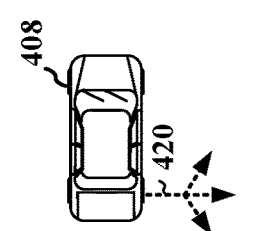
FIG. 4 is a diagram illustrating an example of wireless communication between devices based on sidelink communication.

FIG. 4 is a diagram 400 illustrating an example of wireless communication between devices based on sidelink communication. In some aspects, the sidelink communication may be V2X/V2V/D2D communication. The communication may be based on a slot structure comprising aspects described in connection with FIG. 2. For example, transmitting UE 402 may transmit a transmission 414, e.g., comprising a control channel and/or a corresponding data channel, that may be received by receiving UEs 404, 406, 408. A control channel may include information for decoding a data channel and may also be used by receiving device to avoid interference by refraining from transmitting on the occupied resources during a data transmission. The number of TTIs, as well as the RBs that will be occupied by the data transmission, may be indicated in a control message from the transmitting device. The UEs 402, 404, 406, 408 may each be capable of operating as a transmitting device in addition to operating as a receiving device. Thus, UEs 406, 408 are illustrated as transmitting a transmission 416, 420. The transmissions 414, 416, 420 may be broadcast or multicast to nearby devices. For example, UE 414 may transmit communication intended for receipt by other UEs within a range 401 of UE 414. Additionally/alternatively, RSU 407 may receive communication from and/or transmit communication to UEs 402, 404, 406, 408.

UE 402, 404, 406, 408 or RSU 407 may comprise a channel access priority component, similar to 198 described in connection with FIG. 1.

Figure 5:
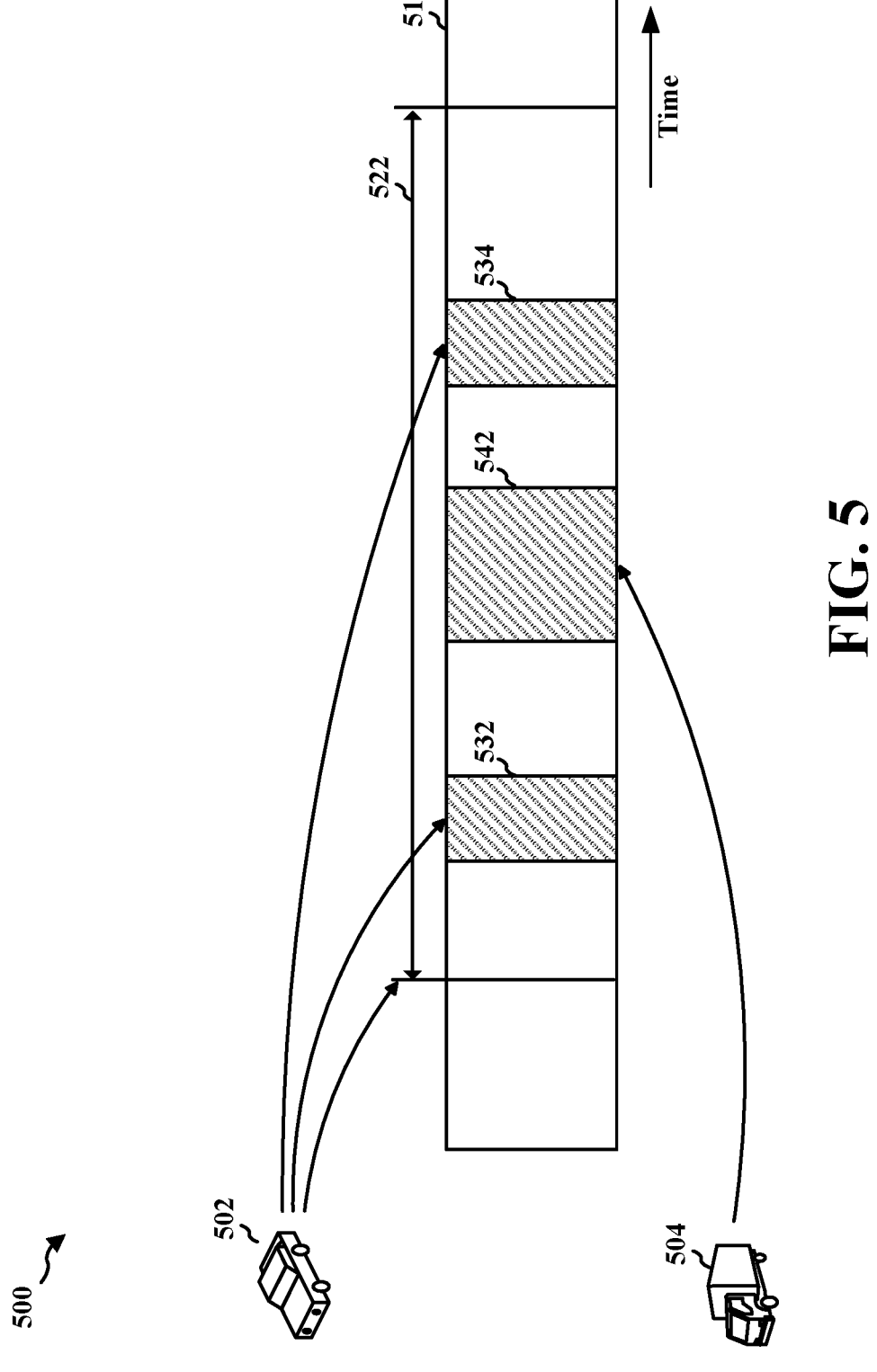
FIG. 5 is a diagram illustrating channel occupancy time (COT) sharing.

FIG. 5 is a diagram 500 illustrating channel occupancy time (COT) sharing. COT may also be referred to as channel occupancy (CO). A first UE 502 and a second UE 504 may be communicating on a shared channel 512 using a sidelink protocol. The communication may be based on V2X, V2V, or D2D based communication directly from a transmitting device to a receiving device. Transmissions from the first UE 702 or the second UE 704 may be broadcast and received by multiple receiving devices within range of the particular transmitting device, as described in connection with FIG. 4. The channel may be shared with other wireless devices which are not communicating using the same sidelink protocol. For example, the first UE 502 and the second UE 504 may be communicating using 5G NR sidelink and the channel may be in the unlicensed spectrum, shared with WiFi devices.

The first UE 502 may initiate a COT 522. For example, the first UE 502 may transmit a transmission on the channel 512; the first UE 502 may also transmit signaling indicating the COT 522. Other devices on the channel receiving the signaling may recognize the COT 522 and may not transmit on the resources in the COT 522, for example, if the other devices are not configured for COT sharing, or are not allowed to share the COT (e.g., the other devices are farther than a distance threshold to the first UE 502). The first UE 502 may also transmit a resource reservation indicating resources 532 and 534 in the COT 522 on which the first UE 502 will transmit.

The second UE 504 may be configured for COT sharing with the first UE 502. Based on the signaling of the COT 522 and the resource reservation transmitted by the first UE 502, the second UE 504 may determine resources 542 in the COT which the first UE 502 did not indicate in the resource reservation (and which have not been reserved by other UEs configured for COT sharing with the first UE 502 and the second UE 504). The second UE 504 may transmit on the resources 542 in the COT 522 initiated by the first UE 502. In some examples, the second UE may determine that it can share the COT based on COT information indicated in the signaling, e.g., an ID of the first UE 502, a location of the first UE 502, etc.

Figure 6:
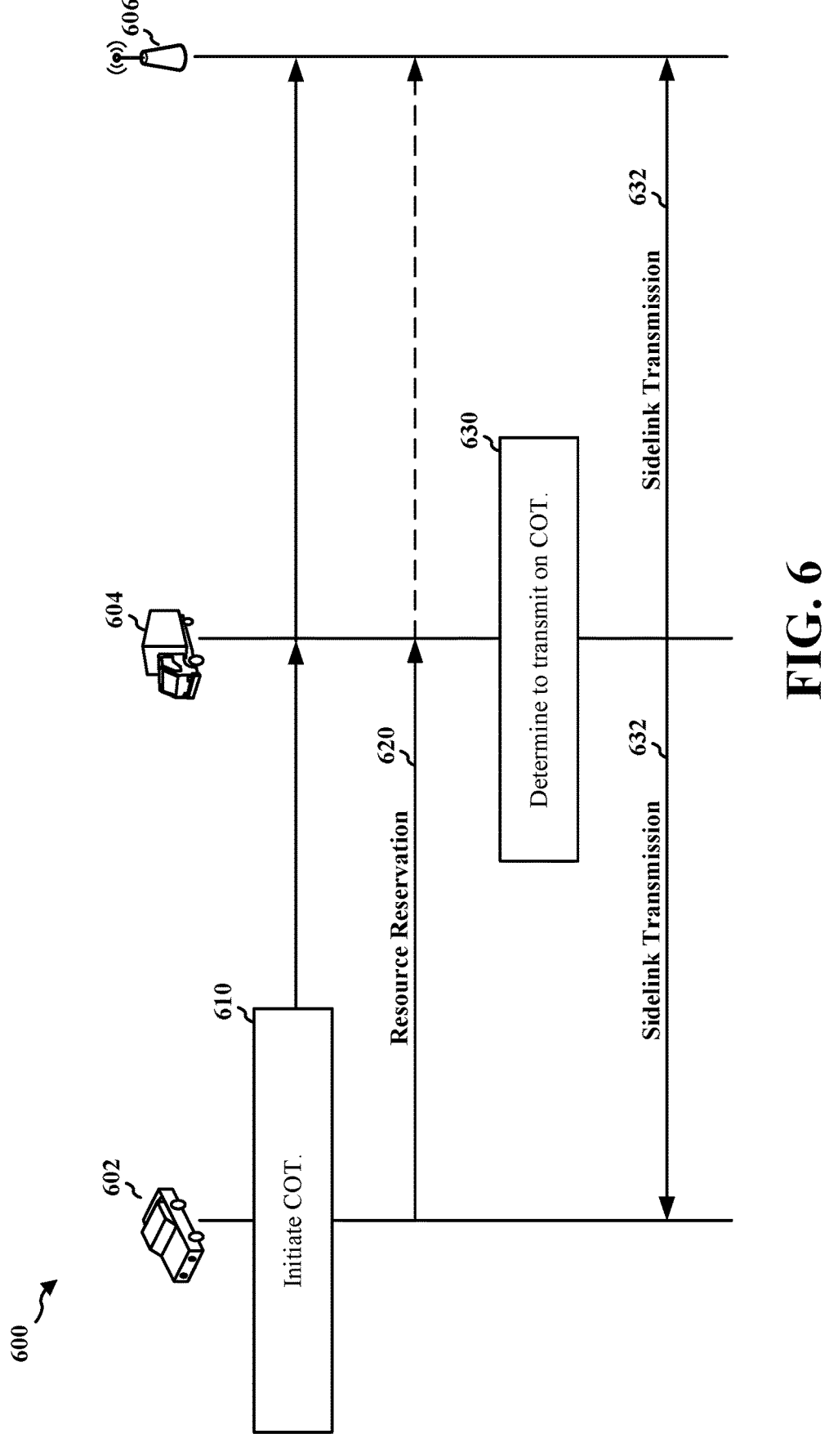
FIG. 6 is a communication flow diagram illustrating COT sharing.

FIG. 6 is a communication flow diagram 600 illustrating COT sharing. A first UE 602, a second UE 604, and a wireless device 606 may be communicating on a shared channel. The first UE 602 and the second UE 604 may be using a sidelink protocol and may be configured for COT sharing. The wireless device 606 may be using the sidelink protocol and may not be configured for COT sharing.

As illustrated at 610, the first UE 602 may initiate a COT on the channel. The first UE 602 may initiate the COT by performing a first channel access procedure such as a Type 1 channel access procedure (e.g., a Category 4 listen-before-talk (LBT) procedure), and upon determining that the channel is clear based on the first channel access procedure, transmitting a transmission (which may contain control signaling and/or a data packet) on the channel which may be received by other devices communicating on the channel using the sidelink protocol. Wireless devices using the sidelink protocol and receiving the transmission (e.g., the wireless device 606) that are not configured for COT sharing may recognize the COT and may not transmit during the COT. Wireless devices communicating on the shared channel using a different protocol may not be able to interpret the transmission and may not be able to recognize the COT, but the first UE 602 and any other UEs sharing the COT may transmit during the COT at intervals such that the wireless devices using other protocols will not transmit during the COT based on their channel access procedures (e.g., LBT procedures).

The first UE 602 may also transmit a resource reservation 620 on the shared channel. The resource reservation 620 may indicate resources in the COT on which the first UE 602 will transmit. In some aspects, the resource reservation 620 may be encoded such that UEs configured for COT sharing with the first UE 602 (e.g., the second UE 604) may receive the resource reservation 620. In some aspects, the resource reservation may be broadcast on the shared channel such that all in-range wireless devices using the sidelink protocol on the shared channel may determine the resources reservation 620.

As illustrated at 630, the second UE 604 may determine to transmit on the COT. The second UE 604 may select resources in the COT which are not identified in the resource reservation 620. The second UE 604 may perform a second channel access procedure such as a Type 2 channel access (e.g., a Category 1 or a Category 2 LBT procedure) to determine that the resources are clear of other transmissions and may transmit a sidelink transmission 632 on the channel (e.g., to wireless devices using the sidelink protocol on the shared channel such as the first UE 602 and the wireless device 606) on the resources of the COT.

The second channel access procedure used by the second UE 604 to identify that the channel was clear during the identified resources may be a faster or a higher priority channel access procedure than the first channel access procedure used by the first UE 602 to identify that the channel was clear before initiating the COT. For example, the first channel access procedure used by the first UE 602 may have included a random back-off within a contention window, and the second channel access procedure used by the second UE 604 may not have included a back-off. The COT initiated by the first UE 602 using the first channel access procedure may facilitate the use of the second channel access procedure by the second UE 604.

FIG. 7 is a communication flow diagram 700 illustrating a priority-based channel access procedure for sidelink communication. A first UE 702 and a second UE 704 may both be communicating using a sidelink protocol on a channel. The communication may be based on V2X, V2V, or D2D based communication directly from a transmitting device to a receiving device. Transmissions from the first UE 702 or the second UE 704 may be broadcast and received by multiple receiving devices within range of the particular transmitting device, as described in connection with FIG. 4. The channel may be shared with other wireless devices which are not communicating using the same sidelink protocol. For example, the first UE 702 and the second UE 704 may be communicating using 5G NR sidelink and the channel may be in the unlicensed spectrum, shared with WiFi devices.

As illustrated at 710, the first UE 702 may determine to transmit a sidelink transmission on the channel. In some aspects, the first UE 702 may determine to transmit the sidelink transmission based on receiving a packet to be transmitted, or based on receiving a packet to be transmitted. In some aspects, the first UE 702 may determine to transmit the sidelink transmission based on determining to initiate a COT on the channel. In some aspects, the sidelink transmission may be a communication for the second UE 704, may include a data packet for the second UE 704, and may include information intended for the second UE 704. In some aspects, the sidelink transmission may be for broadcast to all wireless devices (e.g., devices within communication range) and communicating using the sidelink protocol on the channel. In some aspects, the sidelink transmission may initiate a COT for the first UE 702; i.e., the COT is not intended to be shared with other devices. In some aspects, the sidelink transmission may be for transmission on a COT initiated by another UE, such as the second UE 704, (e.g., through COT sharing as described above with respect to FIGS. 5 and 6).

The channel may be associated with a set of channel access priorities for use by devices communicating on the channel. Each channel access priority may be associated with parameters for wireless devices to use to determine that the channel is clear prior to transmitting on the channel (e.g., a contention window or a COT duration limit). In some aspects, the channel access priorities may be associated with the sidelink protocol and may be used by wireless devices communicating on the channel using the sidelink protocol. In some aspects, the channel access priorities may be associated with the channel, and wireless devices using different communication protocols on the channel may use the same channel access priorities.

In some aspects, the sidelink protocol may use the four channel access priorities (channel access priority class, CAPC) and associated parameters presented in Table 1 where CAPC is the channel access priority, $M_p$ is a number of sensing slots included in defer duration (e.g., a number of sensing slot following a 16 us period within the defer duration), $CW_{min, p}$ is a minimum number of sensing slots included in a contention window, $CW_{max, p}$ is a maximum number of sensing slots included in a contention window, and $CW_p$ Sizes is an allowable number of sensing slots included in a contention window. However, Table 1 is just one example, and in some aspects, other channel access parameters, parameter values, priority levels, and/or numbers of priority levels may be used.

TABLE 1

| CAPC | $M_p$ | $CW_{min, p}$ | $CW_{max, p}$ | $T_{cot, p}$ | $CW_p$ Sizes |
|---|---|---|---|---|---|
| 1 | 1 | 3 | 7 | 2 ms | 3, 7 |
| 2 | 1 | 7 | 15 | 3 ms | 7, 15 |
| 3 | 3 | 15 | 63 | 8 or 10 ms | 15, 31, 63 |
| 4 | 7 | 15 | 1023 | 8 or 10 ms | 15, 31, 63, 127, 255, 511, 1023 |

As illustrated at 720, the first UE 702 may determine a channel access priority prior to performing channel access (e.g., performing a Type 1 channel access for transmission of the transmission). The first UE 702 may determine a channel access priority for the channel access procedure from the set of channel access priorities. In some aspects, the first UE 702 may determine the channel access priority based on a configured channel access priority for the first UE 702 (e.g., a channel access priority configuration for the first UE 702). In some aspects, the first UE 702 may determine the channel access priority based on a packet priority associated with a packet to be transmitted in the sidelink transmission. In some aspects, the first UE 702 may select the channel access priority for the transmission based on a congestion level for the channel. In some aspects, the first UE 702 may select the channel access priority for the transmission based on a remaining time in a packet delay budget of the transmission. Some examples will be provided in more detail below.

As illustrated at 730, the first UE 702 may perform a channel access procedure. The channel access procedure may be to determine that the channel is clear prior to transmitting on the channel. For example, the channel access procedure may be a LBT procedure.

In some aspects, the channel access procedure may be a Type 1 channel access procedure (e.g., a category 4 LBT procedure). The Type 1 channel access procedure may include a clear channel assessment followed by a random back-off within a contention window. In some aspects, the channel access procedure may be a Type 2 channel access procedure (e.g., a category 2 or category 1 LBT procedure). The clear channel assessment may include measuring energy in the channel for a defer duration to determine if any other wireless device is transmitting on the channel. The Type 2 channel access procedure may include a clear channel assessment followed by transmission on the channel without a back-off or contention window if the channel is clear (e.g., Type 2A or Type 2B). The Type 2 channel access procedure may include determining that a time since the previous transmission on the channel was transmitted is below a threshold (e.g., without a clear channel assessment) (e.g., Type 2C).

The channel access procedure may be based on the channel access priority determined by the UE. In some aspects, the UE 702 may use the parameters associated with the channel access priority to perform the channel access procedure.

In some aspects, the channel access procedure may be based on whether the first UE 702 may transmit the transmission on a COT initiated by another UE (e.g., a shared COT). In some aspects, another UE communicating on the channel using the sidelink protocol may have initiated a COT. The COT may have a minimum channel access priority for transmissions on the COT. For example, UEs may make transmissions with a channel access priority equal to or higher than a channel access priority that has been used to initiate the COT. Accordingly, in some aspects, at 730, the UE 702 may transmit the sidelink transmission on a COT based on the sidelink transmission having a channel access priority equal to or greater than a channel access priority for the COT. In some aspects, at 730, the UE 702 may transmit the sidelink transmission on a COT based on the sidelink transmission having a channel access priority equal to or greater than a channel access priority for the UE that initiated the COT.

When the channel access procedure is successful, the first UE 702 may transmit on the channel, for instance, a transmission 740 that includes control signaling and/or a data packet, where it may be received by other wireless devices receiving communications on the channel (e.g., the second UE 704).

FIG. 8 is a communication flow diagram 800 illustrating a priority-based channel access procedure for sidelink communication based on a channel access priority configuration for a transmitting UE. A first UE 802 and a second UE 804 may both be communicating using a sidelink protocol on a channel. The communication may be based on V2X, V2V, or D2D based communication directly from a transmitting device to a receiving device. Transmissions from the first UE 802 or the second UE 804 may be broadcast and received by multiple receiving devices within range of the particular transmitting device, as described in connection with FIG. 4. The channel may be shared with other wireless devices which are not communicating using the same sidelink protocol. For example, the first UE 802 and the second UE 804 may be communicating using 5G NR sidelink and the channel may be in the unlicensed spectrum, shared with WiFi devices.

As illustrated at 810, the first UE 802 may determine to transmit a sidelink transmission on the channel. For example, the first UE 802 may determine to transmit a sidelink transmission as discussed above with respect to 710. There may be a set of channel access priorities specified for use by devices communicating on the channel.

The first UE 802 may be configured with an associated channel access priority. In some aspects, the first UE 802 may be preconfigured with the associated channel access priority. For example, different UEs may be preconfigured with different channel access priorities based on characteristics or use cases of those UEs (e.g., V2X UEs associated with emergency vehicles may be preconfigured with a high priority, V2X UEs associated with commercial vehicles may be associated with a medium priority, and/or V2X UEs associated with passenger vehicles may be associated with a low priority). In some aspects, a network node (e.g., base station 806) may indicate a channel access priority 808 to the UE 802, and the UE 802 may use the received channel access priority as its associated channel access priority. The base station 806 may not control sidelink communication on the channel through scheduling the communication, but the base station 806 may influence or manage traffic on the channel by assigning channel access priorities to UEs communicating on the channel.

In some aspects, the first UE 802 may be configured with multiple channel access priorities corresponding to different actions or transmissions. For example, the first UE 802 may be configured with one channel access priority for initiating a shared COT, configured with another channel access priority for initiating a dedicated COT, and/or configured with a third channel access priority for other sidelink transmissions.

As illustrated at 820, the first UE 802 may determine a channel access priority for the transmission based on channel access priority associated with the first UE 802. In some aspects, where the first UE 802 is configured with a single channel access priority, the first UE 802 may determine to use that channel access priority as the channel access priority for the transmission at 820. In some aspects, where the first UE 802 is configured with multiple channel access priorities corresponding to different actions or transmissions, the first UE 802 may determine the channel access priority for the transmission at 820 based on the purpose of the transmission. For example, if the transmission initiates a shared COT, the first UE 802 may determine the channel access priority for the transmission to be a channel access priority configured for the UE for initiating a shared COT, if the transmission does not initiate a shared COT (e.g., it initiates a dedicated COT), the first UE 802 may determine the channel access priority for the transmission to be a channel access priority configured for the UE for initiating a dedicated COT, or if the transmission is for transmitting data, the first UE 802 may determine the channel access priority for the transmission to be a channel access priority configured for the UE for other sidelink transmissions.

As illustrated at 830, the first UE 802 may perform a channel access procedure. The channel access procedure may be to determine that the channel is clear prior to transmitting the transmission on the channel. The channel access procedure may be based on the channel access priority determined at 820. For example, the first UE 802 may perform the channel access procedure as described above with respect to 730. When the channel access procedure is successful, the first UE 802 may transmit the sidelink transmission 840 on the channel. The transmission may be received by other wireless devices receiving communications on the channel (e.g., the second UE 804).

FIG. 9 is a communication flow diagram 900 illustrating a priority-based channel access procedure for sidelink communication based on a packet priority. A first UE 902 and a second UE 904 may both be communicating using a sidelink protocol on a channel. The communication may be based on V2X, V2V, or D2D based communication directly from a transmitting device to a receiving device. Transmissions from the first UE 902 or the second UE 904 may be broadcast and received by multiple receiving devices within range of the particular transmitting device, as described in connection with FIG. 4. The channel may be shared with other wireless devices which are not communicating using the same sidelink protocol. For example, the first UE 902 and the second UE 904 may be communicating using 5G NR and the channel may be in the unlicensed spectrum, shared with WiFi devices.

As illustrated at 910, the first UE 902 may determine to transmit a sidelink transmission on the channel. For example, the first UE 902 may determine to transmit a sidelink transmission as discussed above with respect to 710. The packet may have an associated packet priority. In one example, the packet priority may be Prose Per Packet Priority (PPPP) specified for sidelink or V2X communication. The packet priority may be one of a set of possible packet priorities for packets of the sidelink protocol (e.g., PPPPs). The packet priority may determine how the packet is handled in contexts other than determining channel access priority.

As illustrated at 920, the first UE 902 may determine a channel access priority for the transmission based on the packet priority. The packet priority may be one of a set of M1 possible packet priorities, and the channel access priority may be determined from a set of M2 possible channel access priorities, based on the packet priority. In some aspects, for example where M1=M2 or M1<M2, each packet priority may be mapped to a channel access priority. In some aspects, for example where M1>M2 (but also including aspects where M1=M2 or M1<M2) one or multiple packet priorities may be mapped to a given channel access priority. The first UE 902 may determine the channel access priority for channel access to be the channel access priority corresponding to the packet priority of the transmission at 920.

In some aspects, the first UE 902 may have multiple packets to transmit in a transmission. The multiple packets may have different packet priorities. At 920, the first UE 902 may select a channel access priority for the channel access based on the packet priorities of all of the packets. For example, the first UE 902 may select the channel access priority corresponding to the highest packet priority of the multiple packets.

For example, in some aspects, the packet priority may be one of eight possible packet priorities (e.g., where the packet priority is the PPPP in a NR V2X communication system) and the channel access priority may be determined from a set of four possible channel access priorities based on packet priority. In one example, packet priority 1 may be mapped to channel access priority 1, packet priority 2 may be mapped to channel access priority 2, packet priorities 3 and 4 may be mapped to channel access priority 3, and packet priorities 5, 6, 7, and 8 may be mapped to channel access priority 4. The first UE 902 may determine a transmission carrying a packet with packet priority 2 to have channel access priority 2. The first UE 902 may determine a transmission carrying a packet with packet priority 5 to have channel access priority 4. When there are multiple packets to transmit, the first UE may determine the channel access priority based on the highest priority of the packets. For example, where a first packet with packet priority 4 and a second packet with packet priority 8 will be transmitted together, the first UE 902 may determine both the first packet and the second packet to have a channel access priority 3 based on the higher packet priority of the first and second packets, packet priority 4.

As illustrated at 930, the first UE 902 may perform a channel access procedure based on the determined channel access priority. The channel access procedure may be to determine that the channel is clear prior to transmitting the transmission on the channel. The channel access procedure may be based on the channel access priority for the transmission determined at 920. For example, the first UE 902 may perform the channel access procedure as described above with respect to 730. When the channel access procedure is successful, the first UE 902 may transmit the sidelink transmission 940 (which may include control signaling and/or a data packet) on the channel, where it may be received by other wireless devices receiving communications on the channel (e.g., the second UE 904).

FIG. 10 is a communication flow diagram 1000 illustrating a priority-based channel access procedure for sidelink communication based on a congestion level of the channel. A first UE 1002 and a second UE 1004 may both be communicating using a sidelink protocol on a channel. The communication may be based on V2X, V2V, or D2D based communication directly from a transmitting device to a receiving device. Transmissions from the first UE 1002 or the second UE 1004 may be broadcast and received by multiple receiving devices within range of the particular transmitting device, as described in connection with FIG. 4. A plurality of other wireless devices 1006 may also be communicating on the channel using the sidelink protocol and/or using another protocol. For example, the first UE 1002 and the second UE 1004 may be communicating using 5G NR sidelink and some or all of the plurality of other wireless devices 1006 may be using 5G NR sidelink, 5G NR or may be using another protocol such as WiFi.

As illustrated at 1008, the first UE 1002 may determine a channel congestion level for the channel. The channel congestion level may be based on transmissions 1009 on the channel, for example, from the second UE 1004 or the plurality of other wireless devices 1006. The channel congestion level may be a channel busy ration (CBR) or may be based on the CBR. The first UE 1002 may determine the CBR by determining a number of resources (e.g., slots) in a window of time which are busy and comparing it to the total number of resources (e.g., slots) in the window.

The first UE 1002 may determine whether a resource was busy based on a received signal strength during that resource. For example, the first UE 1002 may measure a sidelink received signal strength indicator (S-RSSI) during each resource in the window. If the received signal strength is above a threshold, the first UE 1002 may determine that slot was busy.

In some aspects, the threshold may have a value such that transmissions on the channel using protocols other than the sidelink protocol will result in a resource being busy. For example, the threshold may have a value such that WiFi transmissions will result in a resource being busy. In such aspects, the CBR may represent the traffic on the channel from any wireless device.

In some aspects, the threshold may have a value such that transmissions on the channel using the sidelink protocol will result in a resource being busy, but that transmissions on the channel using protocols other than the sidelink protocol will not result in a resource being busy. For example, the threshold may have a value such that V2X transmissions will result in a resource being busy but WiFi transmissions will not result in a resource being busy. In such aspects, the CBR may represent the traffic on the channel by wireless devices using the sidelink protocol (e.g., the CBR represents the V2X traffic on the channel).

As illustrated at 1010, the first UE 1002 may determine to transmit a sidelink transmission on the channel. For example, the first UE 1002 may determine to transmit a sidelink transmission as discussed above with respect to 710.

As illustrated at 1020, the first UE 1002 may determine a channel access priority for the transmission based on the channel congestion level determined at 1008. For example, ranges of CBR values may be mapped to corresponding channel access priorities. In some aspects, a larger CBR value may be mapped to a lower channel access priority. In one example, A CBR between 0 and 0.25 may be mapped to channel access priority 1, a CBR between 0.25 and 0.5 may be mapped to channel access priority 2, a CBR between 0.5 and 0.75 may be mapped to channel access priority 3, and a CBR between 0.75 and 1 may be mapped to channel access priority 4. At 1020, the first UE 1002 may determine the channel access priority for the transmission to be the channel access priority corresponding to the CBR measured at 1008.

In some aspects, a higher CBR, indicating a busy channel, may be mapped to a lower priority channel access procedure, such as in aspects where the received signal strength threshold has a value such that CBR may represent the traffic on the channel by wireless devices using the sidelink protocol. Where the channel is busy with traffic from other UEs using the sidelink protocol, determining transmissions to have a lower priority channel access procedure may result in larger contention window sizes and/or longer COT durations, which may facilitate COT sharing among the UEs and may provide better access for the UEs to transmit on the channel. A lower CBR may be mapped to a higher priority channel access procedure. Where the channel has a low volume of transmissions using the sidelink protocol, UEs using the sidelink protocol may be less likely to hold a shared COT for a long duration. Transmitting transmissions with higher channel access priorities, which may correspond to smaller contention window sizes and/or COT durations, may facilitate UEs performing their own channel access procedures for transmissions.

As illustrated at 1030, the first UE 1002 may perform a channel access procedure. The channel access procedure may be to determine that the channel is clear prior to transmitting the transmission on the channel. The channel access procedure may be based on the channel access priority determined at 1020. For example, the first UE 1002 may perform the channel access procedure as described above with respect to 730. When the channel access procedure is successful, the first UE 1002 may transmit the sidelink transmission 1040 on the channel, where it may be received by other wireless devices receiving communications on the channel (e.g., the second UE 1004 or the plurality of other wireless devices 1006).

FIG. 11 is a communication flow diagram 1100 illustrating a priority-based channel access procedure for sidelink communication based on a remaining packet delay budget. A first UE 1102 and a second UE 1104 may both be communicating using a sidelink protocol on a channel. The communication may be based on V2X, V2V, or D2D based communication directly from a transmitting device to a receiving device. Transmissions from the first UE 1102 or the second UE 1104 may be broadcast and received by multiple receiving devices within range of the particular transmitting device, as described in connection with FIG. 4. The channel may be shared with other wireless devices which are not communicating using the same sidelink protocol. For example, the first UE 1102 and the second UE 1104 may be communicating using 5G NR and the channel may be in the unlicensed spectrum, shared with WiFi devices.

As illustrated at 1110, the first UE 1102 may determine to transmit a sidelink transmission on the channel. For example, the first UE 902 may determine to transmit a sidelink transmission as discussed above with respect to 710. The sidelink transmission may be to transmit a packet with a packet delay budget. The first UE 1102 may receive the packet with the packet delay budget or may generate the packet with the packet delay budget. For example, the packet delay budget may be determined based on a packet priority of the packet and each arrived packet may have an associated packet delay budget. The packet delay budget may indicate a duration of time that the packet has to be delivered to intended receiver devices. If the packet is not successfully delivered within the packet delay budget (e.g., the first UE 1102 is not able to access the channel to transmit the packet), the packet may be dropped by the first UE 1102. The transmission may be referred to as having the packet delay budget of the packet to be transmitted in the transmission.

In some aspects, as illustrated at 1112, the first UE 1102 may determine a remaining time in the packet delay budget for the transmission. The remaining time in the packet delay budget may be the time remaining before expiration of the packet delay budget.

As illustrated at 1120, the first UE 1102 may determine a channel access priority for the transmission based on the packet delay budget for the transmission or based on the remaining time in the packet delay budget for the transmission. For example, ranges of packet delay budget values or remaining time values may be mapped to corresponding channel access priorities. The first UE 1102 may determine the channel access priority for the transmission to be the channel access priority corresponding to the packet delay budget for the transmission or corresponding to the remaining time in the packet delay budget for the transmission.

In some aspects, packet delay budget values or remaining time values may be directly mapped to channel access priorities. The mapping may be such that smaller PDBs or remaining PDBs are mapped to higher channel access priorities. In one example, a packet delay budget or a remaining time between 0 ms and 2 ms may be mapped to channel access priority 1, a packet delay budget or a remaining time between 2 ms and 4 ms may be mapped to channel access priority 2, a packet delay budget or a remaining time between 4 ms and 10 ms may be mapped to channel access priority 3, and a packet delay budget or a remaining time over 10 ms may be mapped to channel access priority 4.

In some aspects, packet delay budget values or remaining time values may be mapped to channel access priorities in an exclusive manner, such that transmissions having a packet delay budget or a remaining time below a specified level cannot be assigned to a given channel access priority. For example, where channel access priority 1 is the highest priority and channel access priority 4 is the lowest priority, any transmission may be assigned channel access priority 1, transmissions having a packet delay budget or a remaining time lower than 2 ms may not be assigned channel access priority 2, transmissions having a packet delay budget or a remaining time lower than 4 ms may not be assigned channel access priority 3, and transmissions having a packet delay budget or a remaining time lower than 10 ms may not be assigned channel access priority 4. In this manner, the channel access priority for the transmission determined at 1120 may be based on factors other than the packet delay budget or remaining time for the transmission, but if the transmission has a low packet delay budget or remaining time, the transmission will be determined to have a high channel access priority.

As illustrated at 1130, the first UE 1102 may perform a channel access procedure. The channel access procedure may be to determine that the channel is clear prior to transmitting the transmission on the channel. The channel access procedure may be based on the channel access priority for the transmission determined at 1120. For example, the first UE 1102 may perform the channel access procedure as described above with respect to 730. When the channel access procedure is successful, the first UE 1102 may transmit the sidelink transmission 1140 on the channel, where it may be received by other wireless devices receiving communications on the channel (e.g., the second UE 1104).

Some of the above embodiments have discussed determining a channel access priority for a transmission based on a single consideration (e.g., with respect to 820, 920, 1020, and 1120). In some aspects, a channel access priority for a transmission may be determined based on a combination of the considerations discussed above. A UE may determining the channel access priority for a transmission based on two or more of a channel access priority configured for the UE, a channel access priority associated with a packet priority of the transmission, a congestion level for the channel, and a remaining time in a packet delay budget of the transmission.

In some aspects, a UE may determine a separate channel access priority with respect to some or all of the methods described above with respect to 820, 920, 1020, and 1120, and the UE may determine the channel access priority for the transmission to be the highest resulting channel access priority.

In some aspects, a UE may determine a channel access priority based on the packet priority of the transmission, as described above with respect to 920. The UE may also compare a packet delay budget of the transmission or a remaining time in the packet delay budget to packet delay budget values or remaining time values may be mapped to channel access priorities in an exclusive manner as described above with respect to 1120. If the packet delay budget or remaining time of the transmission fall within the allowed range for the channel access priority determined based on the packet priority, then the UE may determine the channel access priority determined based on the packet priority to be the channel access priority for the transmission. If the packet delay budget or remaining time of the transmission does not fall within the allowed range for the channel access priority determined based on the packet priority, then the UE may determine the lowest priority channel access priority for which the packet delay budget or remaining time of the transmission falls within the allowed range to be the channel access priority for the transmission.

In some aspects, the UE may have a configured channel access priority for some types of transmissions as described above with respect to 820, but may not have a configured channel access priority for other types of transmissions. In some aspects, the channel access priority is configured based on whether the UE's transmission initiates a shared COT or a dedicated COT. For example, the UE may be configured to initiate a dedicated COT using channel access priority 3 and may be configured to initiate a shared COT using channel access priority 4, but may not be configured to transmit other transmissions based on a specified channel access priority. If a transmission is initiating a dedicated COT, the UE may determine the channel access priority for the transmission to be channel access priority 3. If the transmission is initiating a shared COT, the UE may determine the channel access priority for the transmission to be channel access priority 4. Otherwise, the UE may determine the channel access priority for the transmission based on a packet priority of the transmission, as described above with respect to 920.

In some aspects, the first UE may transmit a transmission on a COT initiated by another UE (e.g., a shared COT). In some aspects, another UE communicating on the channel using the sidelink protocol may have initiated a COT (e.g., the second UE). The COT may be initiated based on a channel access priority. A UE may make transmissions in the shared COT only if it has a channel access priority equal to or higher than the channel access priority that has been used to initiate the COT. Alternatively, in some aspects, A UE may initiate a shared COT based on a channel access priority that is determined by a first packet priority; another UE may transmit a sidelink transmission on the COT only if the transmission has an associated packet priority that is no lower than the first packet priority.

FIG. 12 is a flowchart 1200 of a method of wireless communication. The method may be performed by a transmitting device (e.g., the UE 310, 502, 504, 602, 604, 702, 802, 902, 1002, or 1102).

At 1204, the UE may determine a channel access priority for a sidelink transmission from a set of channel access priorities. For example, the UE may receive a packet (e.g., from an application) or generate a packet for transmission in the sidelink transmission. The sidelink transmission may be a sidelink data transmission or a sidelink control information transmission.

The UE may have a configured channel access priority for sidelink transmissions transmitted by the UE, and determining the channel access priority for the sidelink transmission may include determining the configured channel access priority for the UE to be the channel access priority. The UE may receive the configured channel access priority for the UE from a base station. For example, the configured channel access priority may be configured by a network node, and the UE may receive a signal from the network node indicating the channel access priority for the UE.

The UE may have a channel access priority associated with initiating a channel occupancy, and determining the channel access priority for the sidelink transmission may include determining that the sidelink transmission is to initiate a channel occupancy and determining the channel access priority to be the channel access priority associated with initiating a channel occupancy of the UE.

The sidelink transmission may have a packet priority from a set of packet priorities associated with the set of channel access priorities. For example, each packet priority of the set of packet priorities may be associated with a channel access priority of the set of channel access priorities. Determining the channel access priority for the sidelink transmission may be based on the packet priority of the sidelink transmission. Lower channel access priorities may correspond to lower packet priorities. Each packet priority of the set of packet priorities may be mapped to a channel access priority, and determining the channel access priority for the sidelink transmission may include determining the channel access priority based on the packet priority and the mapping. The UE may transmit the sidelink transmission before transmitting another sidelink transmission based on the packet priority of the sidelink transmission. The UE may transmit the sidelink transmission on a resource reservation for another sidelink transmission based on the packet priority of the sidelink transmission. The set of channel access priorities may have N packet priorities, N being a positive integer, the set of packet priorities may have M packet priorities, M being an integer greater than N, and at least two packet priorities of the set of packet priorities may be mapped to one channel access priority of the set of channel access priorities.

The UE may determine a congestion level for the channel. Determining the channel access priority for the sidelink transmission may be based on the congestion level. The congestion level may be based on a channel busy ratio for the channel. A high congestion level may correspond to a low determined channel access priority level.

The sidelink transmission may have a packet delay budget. Determining the channel access priority for the sidelink transmission may be based on a remaining time in the packet delay budget for the sidelink transmission. Each channel access priority of the set of channel access priorities may have a minimum remaining time. A lower remaining time in the packet delay budget may correspond to a higher channel access priority. Determining the channel access priority for the sidelink transmission may be based on selecting a channel access priority of the set of channel access priorities with a minimum remaining time that is less than the remaining time in the packet delay budget of the sidelink transmission.

In some aspects, determining the channel access priority for the sidelink transmission may be based on a configured channel access priority for the UE, a channel access priority associated with a packet priority of the transmission, a congestion level for the channel, or a remaining time in a packet delay budget of the sidelink transmission. In some aspects, determining the channel access priority for the sidelink transmission may be based on at least two of a configured channel access priority for the UE, a channel access priority associated with a packet priority of the sidelink transmission, a congestion level for the channel, and a remaining time in a packet delay budget of the sidelink transmission.

The sidelink transmission may include one or more of a sidelink control channel transmission and a sidelink data channel transmission. The sidelink transmission may include the channel access priority determined for the sidelink transmission or a packet priority of the sidelink transmission.

At 1206, the UE may perform a channel access procedure based on the determined channel access priority for the sidelink transmission. The channel access procedure may be a contention based channel access with a random contention window size. The channel access procedure may be a listen before talk procedure. The channel access priority may be associated with a channel access parameter, and the UE may perform the channel access procedure using the channel access parameter associated with the channel access priority for the sidelink transmission. The channel access parameter may be a contention window size or a channel occupancy time duration. The UE may perform the channel access procedure with a back-off based on the channel access parameter of the sidelink transmission.

At 1208, the UE may transmit the sidelink transmission to one or multiple receiving UEs based on the channel access procedure. Transmitting the sidelink transmission to the receiving UE or UEs may be broadcasting the sidelink transmission on the channel. The channel may be a shared channel, the UE may transmit the sidelink transmission on the shared channel based on a first wireless protocol, and a wireless device may transmit on the channel using a second wireless protocol different than the first wireless protocol.

FIG. 13 is a diagram 1300 illustrating an example of a hardware implementation for an apparatus 1302. The apparatus 1302 may be a UE or other wireless device that communicates based on sidelink. The apparatus 1302 includes a cellular baseband processor 1304 (also referred to as a modem) coupled to a cellular RF transceiver 1322 and one or more subscriber identity modules (SIM) cards 1320, an application processor 1306 coupled to a secure digital (SD) card 1308 and a screen 1310, a Bluetooth module 1312, a wireless local area network (WLAN) module 1314, a Global Positioning System (GPS) module 1316, and a power supply 1318. The cellular baseband processor 1304 communicates through the cellular RF transceiver 1322 with the UE 104 and/or BS 102/180. The cellular baseband processor 1304 may include a computer-readable medium/memory. The computer-readable medium/memory may be non-transitory. The cellular baseband processor 1304 is responsible for general processing, including the execution of software stored on the computer-readable medium/memory. The software, when executed by the cellular baseband processor 1304, causes the cellular baseband processor 1304 to perform the various functions described supra. The computer-readable medium/memory may also be used for storing data that is manipulated by the cellular baseband processor 1304 when executing software. The cellular baseband processor 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the cellular baseband processor 1304. The cellular baseband processor 1304 may be a component of the UE 350 and may include the memory 360 and/or at least one of the TX processor 368, the RX processor 356, and the controller/processor 359. In one configuration, the apparatus 1302 may be a modem chip and include just the baseband processor 1304, and in another configuration, the apparatus 1302 may be the entire wireless device or UE (e.g., see 350 of FIG. 3) and include the aforediscussed additional modules of the apparatus 1302.

The communication manager 1332 includes a sidelink transmission determination component 1340, a channel access priority component 1342, a channel access procedure component 1344, a packet delay budget component 1346, a channel congestion level component 1348, and/or a packet priority component 1350 configured to perform the aspects described in connection with method and/or flowchart in FIG. 12.

The apparatus may include additional components that perform each of the blocks of the algorithm in the aforementioned flowcharts of FIG. 12. As such, each block in the aforementioned flowcharts of FIG. 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1302, and in particular the cellular baseband processor 1304, includes means for determining a channel access priority for a sidelink transmission from a set of channel access priorities. The apparatus may further include means for performing a channel access procedure based on the determined channel access priority. The apparatus may further include means for transmitting the sidelink transmission to one or multiple receiving UEs based on the channel access procedure.

The aforementioned means may be one or more of the aforementioned components of the apparatus 1302 configured to perform the functions recited by the aforementioned means. As described supra, the apparatus 1302 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following examples are illustrative only and may be combined with aspects of other embodiments or teachings described herein, without limitation.

Example 1 is a method of wireless communication at a user equipment (UE), comprising: determining a channel access priority for a sidelink transmission from a set of channel access priorities; performing a channel access procedure based on the determined channel access priority; and transmitting the sidelink transmission to one or multiple receiving UEs based on the channel access procedure.

Example 2 is the method of Example 1, wherein the UE has a configured channel access priority for the sidelink transmission, and wherein determining the channel access priority for the sidelink transmission comprises determining the configured channel access priority for the UE to be the channel access priority.

Example 3 is the method of Example 1 or 2, wherein the configured channel access priority is configured by a network node, further comprising: receiving a signal from the network node indicating the channel access priority for the UE.

Example 4 is the method of any of Examples 1-3, wherein the UE has a channel access priority associated with initiating a channel occupancy, and wherein determining the channel access priority for the sidelink transmission comprises determining that the sidelink transmission is to initiate a channel occupancy and determining the channel access priority to be the channel access priority associated with initiating a channel occupancy of the UE.

Example 5 is the method of any of Examples 1-4, wherein: the sidelink transmission has a packet priority from a set of packet priorities associated with the set of channel access priorities; and determining the channel access priority for the sidelink transmission is based on the packet priority of the sidelink transmission.

Example 6 is the method of any of Examples 1-5, wherein lower channel access priorities correspond to lower packet priorities.

Example 7 is the method of any of Examples 1-6, wherein each packet priority of the set of packet priorities is mapped to a channel access priority, and determining the channel access priority for the sidelink transmission comprises determining the channel access priority based on the packet priority and the mapping.

Example 8 is the method of any of Examples 1-7, wherein: the set of channel access priorities has N packet priorities, N being a positive integer, the set of packet priorities has M packet priorities, M being an integer greater than N, and at least two packet priorities of the set of packet priorities are mapped to one channel access priority of the set of channel access priorities.

Example 9 is the method of any of Examples 1-8, further includes: determining a congestion level for the channel, wherein determining the channel access priority for the sidelink transmission is based on the congestion level.

Example 10 is the method of any of Examples 1-9, wherein the congestion level is based on a channel busy ratio for the channel.

Example 11 is the method of any of Examples 1-10, wherein a high congestion level corresponds to a low determined channel access priority.

Example 12 is the method of any of Examples 1-11, wherein the sidelink transmission has a packet delay budget, and determining the channel access priority for the sidelink transmission is based on a remaining time in the packet delay budget.

Example 13 is the method of any of Examples 1-12, wherein a lower remaining time in the packet delay budget corresponds to a higher channel access priority.

Example 14 is the method of any of Examples 1-13, wherein: each channel access priority of the set of channel access priorities has a minimum remaining time, and determining the channel access priority for the sidelink transmission is based on selecting a channel access priority of the set of channel access priorities with a minimum remaining time that is less than the remaining time in the packet delay budget of the sidelink transmission.

Example 15 is the method of any of Examples 1-14, wherein determining the channel access priority for the sidelink transmission is based on a configured channel access priority for the UE, a channel access priority associated with a packet priority of the transmission, a congestion level for the channel, or a remaining time in a packet delay budget of the sidelink transmission.

Example 16 is the method of any of Examples 1-15, wherein determining the channel access priority for the sidelink transmission is based on at least two of a configured channel access priority for the UE, a channel access priority associated with a packet priority of the transmission, a congestion level for the channel, and a remaining time in a packet delay budget of the sidelink transmission.

Example 17 is the method of any of Examples 1-16, wherein the sidelink transmission comprises one or more of a sidelink control channel transmission and a sidelink data channel transmission.

Example 18 is the method of any of Examples 1-17, wherein the channel access procedure is a contention based channel access with a random contention window size.

Example 19 is the method of any of Examples 1-18, wherein the channel access priority is associated with a channel access parameter, and wherein the UE performs the channel access procedure using the channel access parameter associated with the channel access priority for the sidelink transmission.

Example 20 is the method of any of Examples 1-19, wherein the channel access parameter is a contention window size or a channel occupancy time duration.

Example 21 is the method of any of Examples 1-20, wherein the sidelink transmission contains a sidelink packet, and wherein transmitting the sidelink transmission to the one or multiple receiving UEs is broadcasting the packet on the channel.

Example 22 is the method of any of Examples 1-21, wherein the sidelink transmission comprises the channel access priority determined for the sidelink transmission or a packet priority of the sidelink transmission.

Example 23 is a system or apparatus including means for implementing a method or realizing an apparatus as in any of Examples 1-22.

Example 24 is a system or apparatus including one or more processors and one or more memories in electronic communication with the one or more processors storing instructions executable by the one or more processors to cause the system or apparatus to implement a method as in any of Examples 1-22.

Example 25 is a non-transitory computer readable medium storing instructions executable by one or more processors to cause the one or more processors to implement a method as in any of Examples 1-22.

What is claimed is:

1. A method of wireless communication at a user equipment (UE), comprising:
determining a channel access priority for a sidelink transmission from a set of channel access priorities;
performing a channel access procedure based on the determined channel access priority; and
transmitting the sidelink transmission to one or multiple receiving UEs based on the channel access procedure, wherein subsequent transmission by the one or multiple receiving UEs are performed based on a channel access priority being equal to or higher than the determined channel access priority.

2. The method of claim 1, wherein the UE has a configured channel access priority for the sidelink transmission, and wherein determining the channel access priority for the sidelink transmission comprises determining the configured channel access priority for the UE to be the channel access priority.

3. The method of claim 2, wherein the configured channel access priority is configured by a network node, further comprising:
receiving a signal from the network node indicating the channel access priority for the UE.

4. The method of claim 1, wherein the UE has a channel access priority associated with initiating a channel occupancy, and wherein performing the channel access procedure further comprises initiating a channel occupancy.

5. The method of claim 1, wherein:
the sidelink transmission has a packet priority from a set of packet priorities associated with the set of channel access priorities; and
determining the channel access priority for the sidelink transmission is based on the packet priority of the sidelink transmission.

6. The method of claim 5, wherein lower channel access priorities correspond to lower packet priorities.

7. The method of claim 5, wherein:
each packet priority of the set of packet priorities is mapped to a channel access priority, and
determining the channel access priority for the sidelink transmission comprises determining the channel access priority based on the packet priority and the mapping.

8. The method of claim 5, wherein:
the set of channel access priorities has N packet priorities, N being a positive integer,
the set of packet priorities has M packet priorities, M being an integer greater than N, and
at least two packet priorities of the set of packet priorities are mapped to one channel access priority of the set of channel access priorities.

9. The method of claim 1, further comprising:
determining a congestion level for the channel, wherein determining the channel access priority for the sidelink transmission is based on the congestion level.

10. The method of claim 9, wherein the congestion level is based on a channel busy ratio for the channel.

11. The method of claim 9, wherein a high congestion level corresponds to a low determined channel access priority.

12. The method of claim 1, wherein:
the sidelink transmission has a packet delay budget, and
determining the channel access priority for the sidelink transmission is based on a remaining time in the packet delay budget.

13. The method of claim 12, wherein a lower remaining time in the packet delay budget corresponds to a higher channel access priority.

14. The method of claim 12, wherein:

each channel access priority of the set of channel access priorities has a minimum remaining time, and determining the channel access priority for the sidelink transmission is based on selecting a channel access priority of the set of channel access priorities with a minimum remaining time that is less than the remaining time in the packet delay budget of the sidelink transmission.

15. The method of claim 1, wherein determining the channel access priority for the sidelink transmission is based on a configured channel access priority for the UE, a channel access priority associated with a packet priority of the transmission, a congestion level for the channel, or a remaining time in a packet delay budget of the sidelink transmission.

16. The method of claim 1, wherein determining the channel access priority for the sidelink transmission is based on at least two of a configured channel access priority for the UE, a channel access priority associated with a packet priority of the transmission, a congestion level for the channel, and a remaining time in a packet delay budget of the sidelink transmission.

17. An apparatus for wireless communication at a user equipment (UE), comprising:

means for determining a channel access priority for a sidelink transmission from a set of channel access priorities;

means for performing a channel access procedure based on the determined channel access priority; and means for transmitting the sidelink transmission to one or multiple receiving UEs based on the channel access procedure, wherein subsequent transmission by the one or multiple receiving UEs are performed based on a channel access priority being equal to or higher than the determined channel access priority.

18. An apparatus for wireless communication at a user equipment (UE), comprising:

a memory; and at least one processor coupled to the memory and configured to:

determine a channel access priority for a sidelink transmission from a set of channel access priorities;

perform a channel access procedure; and transmit the sidelink transmission to one or multiple receiving UEs based on the channel access procedure, wherein subsequent transmission by the one or multiple receiving UEs are performed based on a channel access priority being equal to or higher than the determined channel access priority.

19. The apparatus of claim 18, wherein the UE has a configured channel access priority for the sidelink transmission, and wherein determining the channel access priority for the sidelink transmission comprises determining the configured channel access priority for the UE to be the channel access priority.

20. The apparatus of claim 19, wherein the configured channel access priority is configured by a network node, wherein the processor is further configured to:

receive a signal from the network node indicating the channel access priority for the UE.

21. The apparatus of claim 18, wherein the UE has a channel access priority associated with initiating a channel occupancy, and wherein performing the channel access procedure further comprises initiating a channel occupancy.

22. The apparatus of claim 18, wherein:

the sidelink transmission has a packet priority from a set of packet priorities associated with the set of channel access priorities, and determining the channel access priority for the sidelink transmission is based on the packet priority of the sidelink transmission.

23. The apparatus of claim 22, wherein lower channel access priorities correspond to lower packet priorities.

24. The apparatus of claim 22, wherein:

each packet priority of the set of packet priorities is mapped to a channel access priority, and determining the channel access priority for the sidelink transmission comprises determining the channel access priority based on the packet priority and the mapping.

25. The apparatus of claim 22, wherein:

the set of channel access priorities has N packet priorities, N being a positive integer, the set of packet priorities has M packet priorities, M being an integer greater than N, and at least two packet priorities of the set of packet priorities are mapped to one channel access priority of the set of channel access priorities.

26. The apparatus of claim 18, wherein the processor is further configured to:

determine a congestion level for the channel, wherein determining the channel access priority for the sidelink transmission is based on the congestion level.

27. The apparatus of claim 18, wherein:

the sidelink transmission has a packet delay budget, and determining the channel access priority for the sidelink transmission is based on a remaining time in the packet delay budget.

28. The apparatus of claim 27, wherein:

each channel access priority of the set of channel access priorities has a minimum remaining time, and determining the channel access priority for the sidelink transmission is based on selecting a channel access priority of the set of channel access priorities with a minimum remaining time that is less than the remaining time in the packet delay budget of the sidelink transmission.

29. The apparatus of claim 18, wherein determining the channel access priority for the sidelink transmission is based on a configured channel access priority for the UE, a channel access priority associated with a packet priority of the transmission, a congestion level for the channel, or a remaining time in a packet delay budget of the sidelink transmission.

30. A non-transitory computer-readable medium storing computer executable code for wireless communication at a user equipment, the code when executed by a processor causes the processor to:

determine a channel access priority for a sidelink transmission from a set of channel access priorities;

perform a channel access procedure based on the determined channel access priority; and transmit the sidelink transmission to one or multiple receiving UEs based on the channel access procedure, wherein subsequent transmission by the one or multiple receiving UEs are performed based on a channel access priority being equal to or higher than the determined channel access priority.

31. The apparatus of claim 18, wherein the subsequent transmission by the one or multiple receiving UEs are further made on a shared channel occupancy corresponding to the channel access procedure.

32. The method of claim 1, wherein the subsequent transmission by the one or multiple receiving UEs are further made on a shared channel occupancy corresponding to the channel access procedure.

\*    \*    \*    \*    \*